O. S. CHEW.
TROLLEY WHEEL.
APPLICATION FILED SEPT. 18, 1909.
957,655.
Patented May 10, 1910.
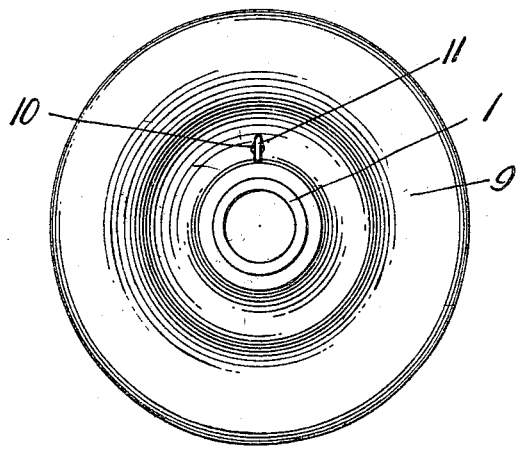
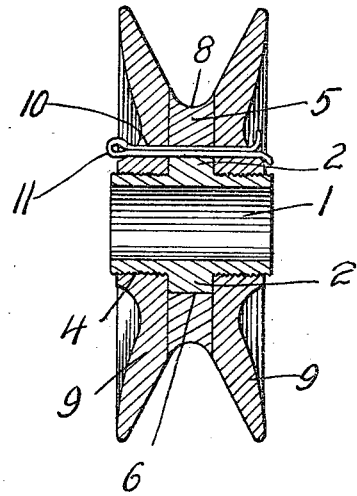
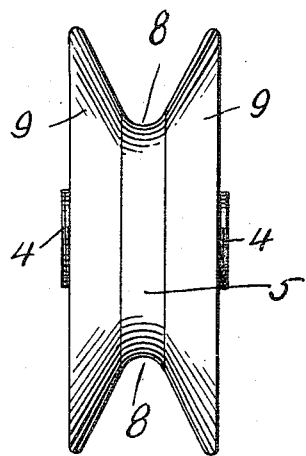
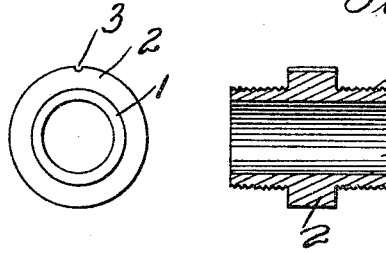
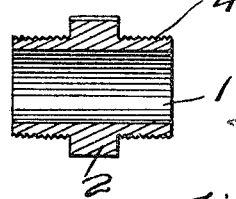
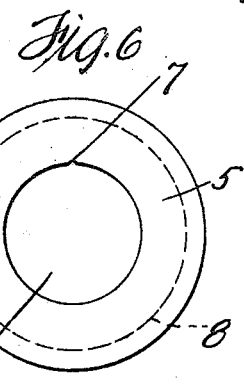
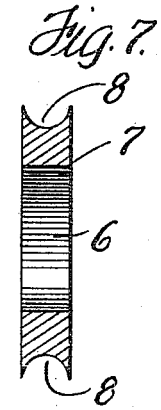
WITNESSES:—
INVENTOR.
O. S. Chew.
BY
ATTORNEYS.

UNITED STATES PATENT OFFICE.

OWEN S. CHEW, OF BROOKFIELD TOWNSHIP, TRUMBULL COUNTY, OHIO.

TROLLEY-WHEEL.

957,655.

Specification of Letters Patent.   Patented May 10, 1910.

Application filed September 18, 1909.   Serial No. 518,344.

*To all whom it may concern:*

Be it known that I, OWEN S. CHEW, a citizen of the United States of America, residing at Brookfield township, in the county of Trumbull and State of Ohio, have invented certain new and useful Improvements in Trolley-Wheels, of which the following is a specification, reference being had therein to the accompanying drawing.

This invention relates to trolley wheels, and the primary object of my invention is to provide a trolley wheel with separable parts that can be removed and renewed when worn without dispensing with those parts that are not subjected to the wear and tear upon trolley wheels.

Another object of my invention is to provide a trolley wheel consisting of comparatively few parts inexpensive to manufacture, quickly assembled and highly efficient for the purposes for which they are intended.

With the above and other objects in view which will more readily appear as the invention is better understood, the same consists in the novel construction, combination and arrangement of parts to be hereinafter described in connection with the drawing forming a part of this specification, wherein there is illustrated a preferred embodiment of the invention; but it must be understood that the structural elements thereof can be varied or changed without departing from the spirit of the invention.

In the drawing:—Figure 1 is a side elevation of a trolley wheel constructed in accordance with my invention, Fig. 2 is a vertical cross sectional view of the same, Fig. 3 is a front elevation of the wheel, Fig. 4 is an end view of the hub section of the wheel, Fig. 5 is a sectional view of the same, Fig. 6 is an end elevation of the bearing section of the wheel, and Fig. 7 is a vertical sectional view of the same.

My wheel consists of a hub section, a bearing section and rim or flange sections, these sections being assembled and locked together to provide a wheel capable of considerable wear and tear by contacting with an electrical conduit, as a trolley wire.

The hub section comprises a sleeve 1 provided intermediate the ends thereof with a peripheral collar 2, said collar having the periphery thereof provided with a transverse groove 3. The ends of the sleeve 1 are exteriorly screw threaded, as at 4 for a purpose that will hereinafter appear. The sleeve 1 is adapted to receive the bushing and journal pin of a harp (not shown).

5 denotes a circular bearing section provided with an opening 6 to receive the collar 2, said opening 6 having the wall thereof provided with a transverse groove 7 adapted to register with the groove 3 of the collar 2. The bearing section 5 has the periphery thereof provided with a circumferentially arranged groove 8, said groove being substantially semi-circular in cross section.

9 denotes circular flange sections adapted to screw upon the ends of the sleeve 1, said flange sections when assembled relative to the section 5 forming a circumferentially arranged groove adapted to receive an electrical conduit, the inner sides of the sections 9 alining and forming a continuation of the sides of the groove 8, thereby providing a trolley wheel resembling in all exterior respects the present type of trolley wheel. The flange sections 9 are provided with openings 10 adapted to aline with the opening formed by the grooves 3 and 7, whereby a cotter pin 11 can be placed in said openings to lock the flange sections and bearing section relative to the hub section. Any other type of pin can be used that will accomplish the same result as the cotter pin shown in Fig. 2.

The various parts or sections of the wheel can be made of strong and durable metal, and it is apparent from the novel construction that the different parts or sections can be removed or renewed when worn out without discarding the entire wheel, thereby reducing the expense of maintenance in connection with the trolleys of electrical railway systems.

Having now described my invention what I claim as new, is:—

A trolley wheel embodying a hub section, a bearing section and flange sections, said hub section comprising a sleeve with a collar intermediate the ends of said sleeve, the ends being exteriorly screw threaded and the periphery of said collar provided with a transverse groove, said bearing section having a central opening adapted to receive the collar of said hub section, with the wall of said opening provided with a transverse groove adapted to aline with the groove of said collar, and provide an opening, said bearing section having the periphery thereof provided with a circumferentially arranged groove, said flange sections being provided with interiorly threaded openings adapted to receive the threaded ends of said sleeve, said flange sections having the inner sides thereof shaped to provide a continuation of the sides of the groove of said bearing section, said flange sections having openings formed therein adapted to aline with the opening of said hub and bearing section, and a pin mounted in the opening of said sections and adapted to lock said sections together.

In testimony whereof I affix my signature in the presence of two witnesses.

OWEN S. CHEW.

Witnesses:
JASPER CHEW,
THOMAS G. PETRINI.